United States Patent [19]
Scales

[11] 3,794,851
[45] Feb. 26, 1974

[54] CIRCUITRY FOR ELIMINATING FALSE TRIGGERING BY TRANSIENT NOISE

[75] Inventor: Richard W. Scales, Rochester, N.Y.

[73] Assignee: Eastman Kodak Company, Rochester, N.Y.

[22] Filed: May 4, 1973

[21] Appl. No.: 357,443

[52] U.S. Cl. .............................. 307/43, 324/43 R
[51] Int. Cl. .......................................... G01r 33/02
[58] Field of Search..... 324/24, 34 TA, 43 R, 47, 4, 324/.5; 307/116, 117, 118, 43; 340/174.1

[56] References Cited
UNITED STATES PATENTS
3,679,969  7/1972  Fussell .............................. 324/43 R Primary Examiner—Herman J. Hohauser

[57] ABSTRACT

A circuit is provided for detecting a defect in the surface of a movable strip of material which, in effect, comprises two channels. The one channel is concerned with detecting an area in which the defect occurs and from the area deriving a series of pulses to ultimately generate a control pulse. The second channel detects any environmental transient noise and introduces the signal generated by such noise into the first channel. If the environmental transient noise is detected by both channels, the pulse and signal so generated are self-cancelling, thereby eliminating any false triggering that might be produced by the noise signal as related to the control pulse.

7 Claims, 2 Drawing Figures

CIRCUITRY FOR ELIMINATING FALSE TRIGGERING BY TRANSIENT NOISE

FIELD OF THE INVENTION

The invention relates to circuitry for eliminating false triggering and, particularly, with respect to false triggering that can be initiated by environmental transient noise.

DESCRIPTION OF THE PRIOR ART

Transient noise has always been a source of signal generation which causes improper or irregular actuation of circuitry concerned with pulsing systems. In apparatus for character recognition, signals in each of a plurality of channels are analyzed to determine whether or not the signals are representative of areas on the character-bearing surface being scanned. In order to produce signals giving accurate indication of the time duration of character-forming areas and at the same time to provide apparatus which is relatively insensitive to spurious peaks in the output signals as well as to gaps in the signal, a transducer is arranged with respect to each of a number of channels together with associated means for quantizing the scanning signal to determine whether it is indicative of scanned character-forming means.

In certain magnetic detector systems, a plurality of sensors are utilized to detect the magnetic field along predetermined axes and to generate electrical signals indicative of the respective magnitudes of the sensed magnetic fields. In such a system, the magnetic effect caused by the environmental elements are nullified or compensated for due to the shift in the magnetic field caused by magnitude and location of the source of the magnetic disturbance. In some instances, the electrical signals generated by the sensors are operated upon to provide compensated signals equal and opposite to those indicated.

In the determination of magnetic flux derived from the total quantity of magnetic ink used to print each of a number of symbols or characters, for example, as in characters printed with magnetic ink on checks, tapes, documents, etc., the total quantity of ink in each symbol is measured in terms of the magnetic flux, thereby eliminating any erroneous signals as well as voids in the signal pattern that might be obtained when a character is printed only in part or with gaps.

The prior art is directed primarily to transient noise developed by or within the system per se. In many instances, however, circuitry is used in an environment in which transient noise is prevalent and can be of an amplitude sufficient to not only be detected by the circuitry but also to falsely trigger the circuitry. When detected, such transient noise must be eliminated in order that the circuitry can function in its expected and required manner. Accordingly, it is desirable to provide a system wherein the effect of any environmental transient noise is eliminated, thereby alleviating any false triggering of the associated circuitry.

SUMMARY OF THE INVENTION

One of the objects of the invention is to provide circuitry which includes means for detecting and eliminating any environmental transient noise that might cause false triggering of the circuitry.

Another object of the invention is to provide circuitry capable of sensing environmental transient noise and eliminating the signal generated by such noise when the noise is detected simultaneously by at least two separate and independent channels forming a part of the circuitry.

Yet another object of the invention is to provide circuitry responsive to environmental transient noise in which the signal generated by such noise is cancelled when detected with no other pulse or signal, and eliminates the effect of a desired pulse or signal when the transient noise signal and the desired signal are detected simultaneously and generally in synchronism with one another.

These and other objects and advantages of the invention will be apparent to those skilled in the art by the description which follows.

The invention is particularly applicable to high-speed analysis of the surface of a web or strip of material for detecting imperfections in the surface as the material is moved relative to one or more transducers arranged transversely of the direction of movement thereof. In the course of inspection of a web or strip of material, an area in which a defect has been detected is saturated magnetically and produces spaced zones of magnetic flux. The transducer detects such an area of magnetic flux and from the zones comprising the area produces a series of pulses of predetermined frequency and polarity. The transducer will also produce a pulse upon detecting any normal transient noise due to dust, dirt, etc. on the surface of the material, or to stray magnetic flux inadvertently produced on the surface at the time of detecting the defect or imperfection. In order that the circuitry will be capable of being used in an environment producing or capable of producing transient noise of a high level or amplitude, it is possible that such noise will also be detected by the transducer. The detection of the environmental transient noise results in a signal being generated that is not wanted and that can be of an amplitude greater than that derived from either the normal transient noise or the magnetic flux of a saturated area. In a separate channel, an antenna senses any environmental transient noise which is then acted upon to produce a signal that is introduced into the circuitry with the signal generated by the circuitry from the same transient noise. When this occurs, that is, the signals occur simultaneously, the environmental transient noise signals automatically cancel one another. As a result, the possibility that the circuitry might be falsely triggered by either of these signals is eliminated.

DESCRIPTION OF THE DRAWING

Reference is now made to the drawing wherein like reference numerals and characters designate like parts and wherein.

DESCRIPTION OF THE PREFERRED EMBODIMENT

Figure 1:
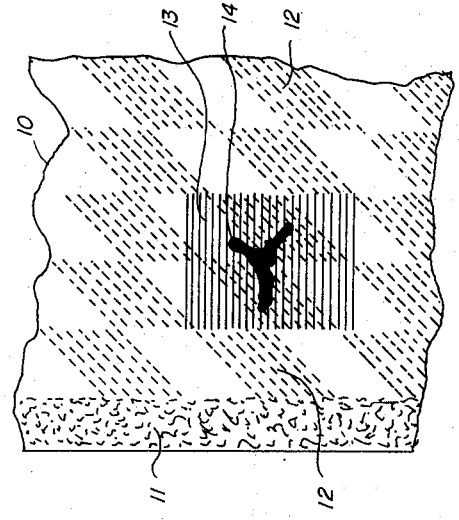
FIG. 1 is a partial plan view of a web or strip of material showing schematically a pattern of magnetic ink that can be printed on a surface of the material and an area surrounding a defect that has been magnetically saturated.

With reference to FIG. 1, a web or strip of material designated by the numeral 10 comprises a web of paper having a magnetic stripe 11 applied along one or both edges thereof and patterns of magnetic ink denoted by the numeral 12 printed on a surface of the strip 10. Each of the patterns 12 can comprise a plurality of lines of printed matter or some preconceived pattern of magnetic ink that will provide a number of zones of magnetic flux when magnetically saturated. As shown in FIG. 1, the patterns 12 are printed in such manner as to provide an array of spaced patterns that are repetitive in a longitudinal direction as well as spaced patterns that are repetitive in a transverse direction. There is disclosed and described in more detail in U. S. patent application, Ser. No. 357,442, filed May 4, 1973, in the names of Yuval Kachioff and Howard R. DeMallie, a system for applying the magnetic ink pattern to a surface of a photosensitive paper and for detecting defects which are designated by magnetically saturating the pattern or patterns 12 in an area 13 surrounding the defect and denoted by the numeral 14. It is with respect to locating each detected defect for removal from the strip 10 that the present invention is primarily concerned. However, it is to be understood that the invention per se has applications in many other fields aside from that disclosed and described herein as being a preferred embodiment of the invention.

Figure 2:
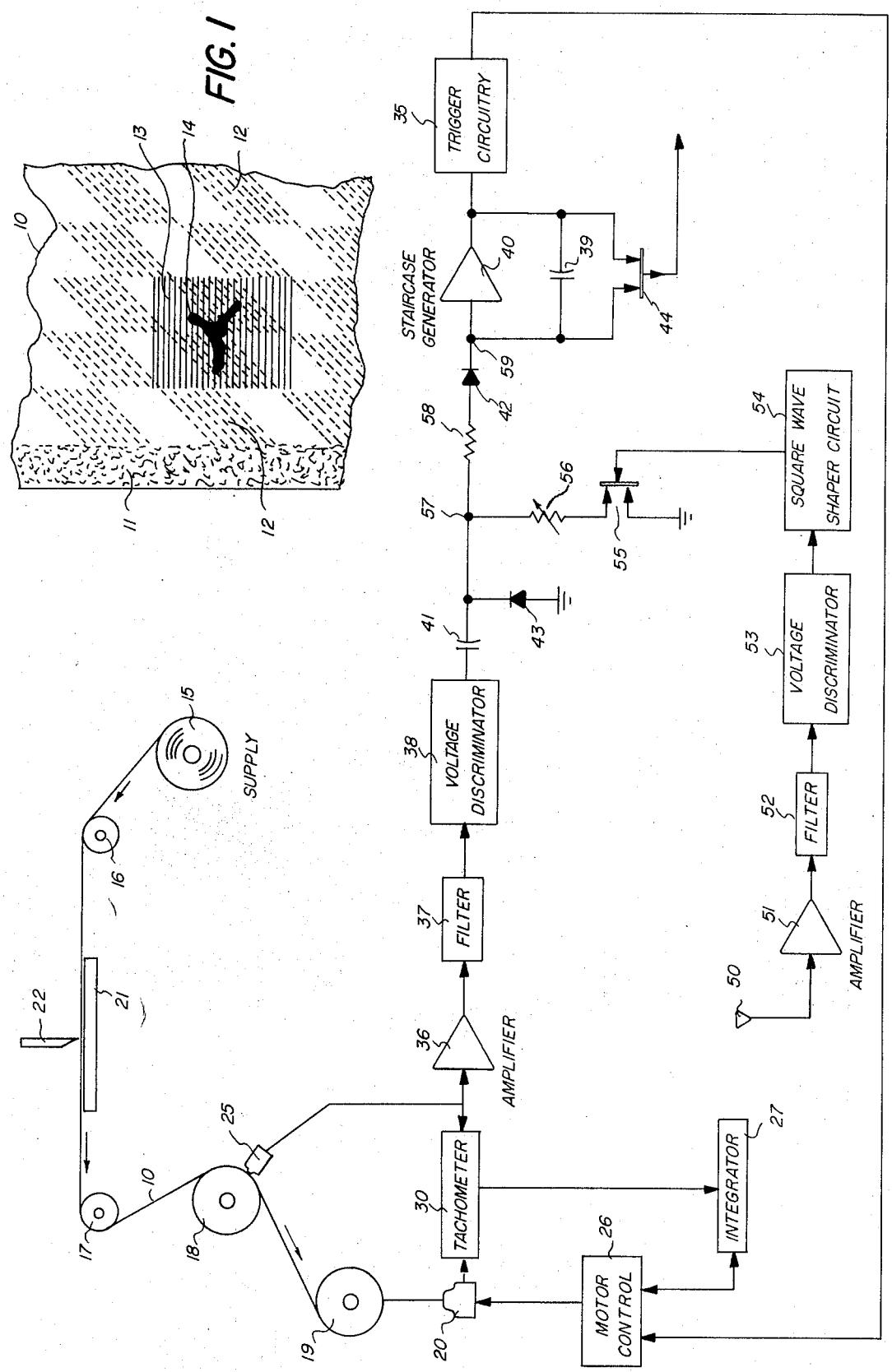
FIG. 2 is a schematic wiring diagram showing the manner in which the circuitry comprising the invention can be incorporated into a system for detecting defects in a moving web or strip of photosensitive material.

With reference to FIG. 2, the strip 10 of material is moved from a supply roll 15 by a group of rolls 16, 17 and 18 which provide a path of movement for the strip to a take-up roll 19 that is driven by motor 20 for moving the strip. Intermediate the rolls 17 and 18 is a work station 21 in which the strip 10 has the defective area removed therefrom as exemplified by knife blade 22; the strip is then spliced together to continue movement of the strip until another defect is detected. An area 13 is removed by cutting completely across the strip 10 on each side of the defect 14.

A transducer 25 is arranged with respect to roll 18 for detecting or sensing a magnetically saturated area 13 on the web 10, such area being shown in FIG. 1 by horizontal lines which include about three patterns in both the transverse and longitudinal directions. In FIG. 2 only a single transducer 25 is shown; however, a plurality of such transducers can be arranged transversely of the strip in accordance with the width of the strip that is being scanned. The transducers 25 can be aligned across strip 10 in accordance with each longitudinal array of patterns 12, or staggered relative to one another.

In normal operation, upon detection of a magnetically saturated area 13, the speed of the web is such that the area with the defect 14 is carried or moved past the work station 21. If the strip 10 were immediately braked, upon detection of an area 13, the strip tension would be such that the strip would tear and, possibly, at a point at which there is no actual defect. Accordingly, upon detection of an area having a defect, the web is brought to a gradual stop and then reversed in its direction of movement to position the defect relative to the work station and knife blade 22. The stopping of the strip and the distance that is must be moved in a reverse direction is initiated by the pulses generated by the spaced, magnetically saturated zones in an area 14. These pulses are utilized through a control circuit 26 to change the direction of movement of the strip 10 by the motor 20.

The first of the series of pulses generated by the transducer 25 from the pattern or patterns 12 in an area 13 is transmitted to a tachometer 30. The tachometer 30 continuously generates a voltage, the amplitude of which is proportional to the linear speed of the strip 10. When a control pulse is derived from trigger circuitry 35, motor control circuit 26 is initiated and a voltage is built up by integrator circuit 27, the accumulated voltage being in accordance with the distance the defect is moved beyond head 25. After the strip is brought to a stop, it is then reversed in its direction of movement by the motor 20 together with a follower motor (not shown) connected to supply roll 15. The strip 10 is moved in a reverse direction in accordance with the voltage generated by tachometer 30 in the integrator circuit 27. This voltage places the defect in the vicinity of head 25, where first detected. However, motor control circuit 26 supplies an additional bias so the defect is actually moved into a position relative to knife 22. After the defect has been cut out and the strip has been spliced, the motor 20 again moves the web to the left. The splice will then be moved under head 25 and if the defect has not been completely removed, the strip will again be stopped and the aforementioned procedure will be repeated.

The series of pulses generated by the zones of the pattern or patterns 12 in the direction of movement of strip 10 by transducer 25 is applied to an amplifier 36. The amplifier 36 which includes a filter network 37 having a frequency bandwidth corresponding to strip speeds of from about 50 feet to 1000 feet per minute. The output pulses from the amplifier 36 are, therefore, at a frequency that corresponds to the rate of movement of the strip 10 of material. The output pulses from amplifier 36 are applied to a voltage discriminator circuit 38. However, the pulses must have an amplitude at least equal to or greater than the predetermined trigger level of the discriminator circuit even though the pulses may be of variable duration. As a result, any pulses generated by normal transient noise of the circuit elements per se will not be of sufficient amplitude to rise above the trigger level for transmission by the voltage discriminator circuit 38. The series of pulses from circuit 38 are transmitted successively to a capacitor 41 which stores the voltage of each discrete pulse and discharges it into capacitor 39 during the interval between successive pulses. The diode 42 permits transmission of only positive pulses to the capacitor 39. Any negative-occurring pulses are directed to ground through diode 43. The capacitor 39 stores the accumulated voltages from the series of pulses, the trigger level of the staircase generator 40 being determined by a predetermined number of the series of pulses occurring within a fixed interval of time. Upon attaining or accumulating a voltage corresponding to the trigger level, a signal is transmitted to trigger circuit 35 which, in turn, releases a control pulse that is connected to motor control circuit 26 and then to integrator 27. With this arrangement, the voltage accumulated by generator 43, as described hereinbefore, will be determined by a predetermined time interval and the number of the pulses that can be generated in such interval from the pattern or patterns 12 in the area 13 that has been magnetically saturated, the frequency of the series of pulses will, of course, be related to the rate at which the strip 10 is being moved. The head 25 can also generate a pulse by striking the surface of the web, by contacting dirt, dust, etc. on a surface of the strip 10 of material, or by detecting stray magnetic flux that may have been applied inadvertently to the material at the time of detecting the defect and before being slit into strips. Such a pulse is usually considered as being generated by transient noise other than the inherent noise that may be prevalent in the circuit elements per se and will, for the most part, be a single pulse. If a pulse generated by transient noise is of sufficient amplitude and of the proper polarity, it will be transmitted to the capacitor 39 in the same manner as one of a series of pulses. However, since such a pulse is usually a single pulse and will normally be occurring at random times, it will not be followed within the predetermined time interval by the required number of additional pulses. When this condition occurs, the charge stored in capacitor 39 is automatically discharged through field effect transistor 44. It should be pointed out that, inasmuch as the strip 10 of material is one comprising a photosensitive layer, the transducer 25 must, of necessity, be spaced from the surface of the strip to alleviate any possibility of any abrasive action between the strip 10, head 25 and roll 16.

A second channel is provided for detecting independently of the transducer 25 any environmental transient noise. This is accomplished by an antenna 50 which picks up the environmental transient noise and transmits it as a signal to an amplifier 51 that is matched to amplifier 36. The amplifier 51 also includes a filter network 52, the latter having a gain and a bandwidth that is greater than that of network 37. This difference in the filter networks 37 and 52 places the signal derived from environmental transient noise by antenna 50 at transistor 53 slightly ahead of that derived from head 25 to insure cancellation as discussed hereinafter. The output from the amplifier 51 is applied to a voltage discriminator circuit 53 having a trigger level which matches that of discriminator 38. Accordingly, any signal picked up by both head 25 and antenna 50 will correspond when derived from discriminator circuits 38 and 53. Any signal from the discriminator circuit 53 is then transformed into a square wave by the shaper circuit 54, the duration of which is proportional to the noise pulse width. This square wave signal is applied to storage means or capacitor 39 through a field effect transistor 55 and a variable resistor 56 connected into the staircase generator circuit 40 at a junction point 57 between a resistor 58 and the junction point 59 of capacitor 39 and diode 42. The resistor 56 is made adjustable so all of the transient noise signal derived from the environment can be eliminated, in which case the resistor is set to 0 ohms, or set to permit the level to be up to or equivalent to that of a normal pulse. When the resistor 55 is set to 0 ohms, then the total signal introduced at the drain of transistor 55 is transmitted to ground, provided the square wave signal from circuit 54 is at the gate of transistor 55. When the resistor is adjusted to some other value, then the signal proceeds partly to the capacitor 39 through diode 42 and partly to ground. Any pulse that is stored in capacitor 39 is unaffected by the action of the field effect transistor 54.

The output from the amplifier 36 can include both a pulse generated from a magnetically saturated zone on the strip of material as well as any normal transient noise that might be picked up at the same time. However, if such occurrence is simultaneous, only a single pulse is obtained. Also, it is possible that environmental transient noise can be coincident with a pulse derived from a saturated zone but the possibility of such simultaneousl occurrence is very remote. In this case, the pulse will cancel the signal, provided resistor 55 is set to 0 ohms. When the head 25 detects the same environmental transient noise as antenna 50 without detection of an area 13, both the pulse and noise signal will be eliminated, because of their simultaneous occurrence.

As pointed out hereinabove, the control pulse derived from the trigger circuitry 35 is used to initiate the motor control 26 which, in turn, initiates integrator 27. The latter controls ramp speed of motor 20 so it is slowed down at the proper rate to bring the strip to a stop. At this time, a signal to the motor reverses its direction to position the area 13 having the defect 14 in a position relative to the head 25. This movement in a reverse direction is a function of the voltage transmitted to integrator 27 by tachometer 30. This is, in effect, an analog system and can be a pulse or digital system as well. The motor control 26 provides an additional bias to motor 20 which maintains it in an energized state for a time sufficient to place the defect 14 relative to knife 22.

While the invention has been disclosed and described with respect to a detecting and winding mechanism for photosensitive material, its application can be of use in many other fields. It is of particular significance that the transducer 25 need not be in contact with the surface of the material from which it is deriving signals, whether a single or a plurality of such transducers is utilized. It should be evident to those skilled in the art that the circuitry disclosed hereinabove presents a revolutionary departure from the general type of noise elimination circuitry presently known in the art.

This invention has been described in detail with particular reference to preferred embodiments thereof, but it will be understood that variations and modifications can be effected within the spirit and scope of the invention.

I claim:

1. A system for eliminating false triggering by transient noise in the environment of the system, comprising:

means for detecting an area having zones of magnetic flux on a medium movable relative to a transducer, normal transient noise and environmental transient noise, and for generating from the magnetic flux a series of pulses of predetermined frequency and polarity, from the normal transient noise a first spurious signal, and from the environmental transient noise a second spurious signal;

means responsive to the series of pulses for storing the same until an amplitude, as established by a predetermined number of pulses within a fixed interval of time, has been attained;

means responsive to the established amplitude for triggering the storing means to release a control pulse having the established amplitude;

means for sensing environmental transient noise and generating therefrom a third spurious signal when the level of the environmental transient noise is at least equal to or greater than that of the normal transient noise; and means for interconnecting the spurious signals to the storing means, whereby the first and second spurious signals are retained only when provided within an interval of time and in a number corresponding to that for the series of pulses, and the second and third spurious signals cancel one another when provided simultaneously.

2. The system in accordance with claim 1 wherein the detecting means comprises the transducer, an amplifier interconnected to the transducer and a voltage discriminator circuit interconnected to the amplifier whereby the series of pulses and spurious signals are of substantially the same amplitude.

3. The system in accordance with claim 1 wherein the storing means comprises a two diode storage counter interconnected to the detecting means and responsive to the series of pulses, a capacitor connected to the counter for storing the voltage accumulated by the predetermined number of pulses, and a trigger switching circuit responsive to the accumulated voltage for providing the control pulse.

4. The system in accordance with claim 1 wherein the sensing means comprises an antenna for picking up the environmental transient noise, an amplifier interconnected to the antenna, a voltage discriminator circuit interconnected to the amplifier and a shaper circuit responsive to the output from the discriminator circuit, whereby the third spurious signal is of the same amplitude and of opposite polarity relative to the second spurious signal.

5. The system in accordance with claim 4 wherein the shaper circuit is interconnected with the storing means through an adjustable resistor, whereby the amplitude of the third spurious signal can be varied from zero to at least that of the second spurious signal.

6. The system in accordance with claim 2 wherein the amplifier is connected to a plurality of transducers arranged transversely of the path of movement of the medium.

7. The system in accordance with claim 3 wherein the storage counter includes a triggering capacitor for storing each pulse amplitude and discharging the same into a storing capacitor having a discharge storing amplitude equivalent to that of the established amplitude.

* * * * *